INVENTOR.
Walther F. Scheel

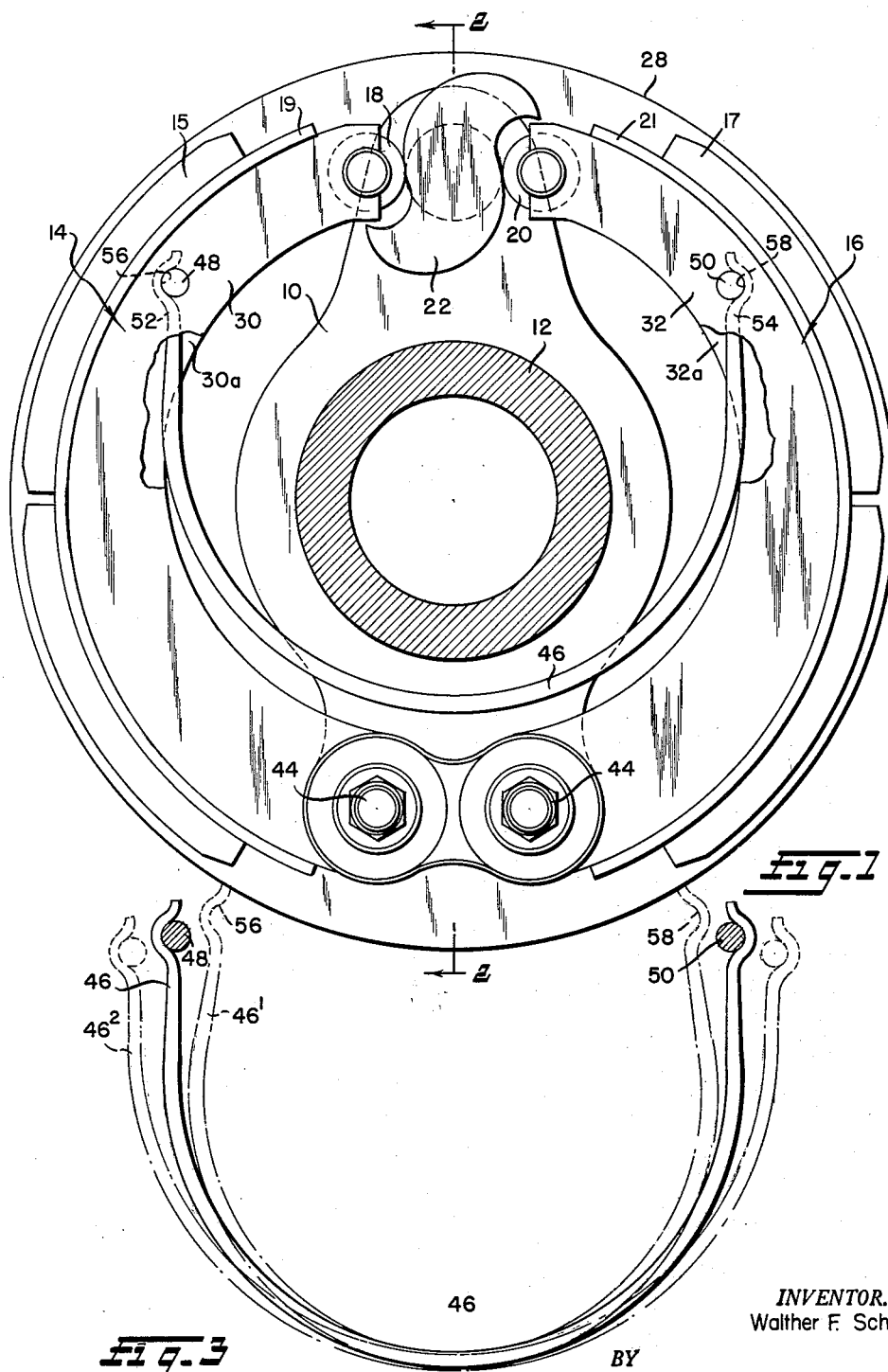

July 2, 1963

W. F. SCHEEL 3,095,950

FLAT, TAPERED HORSESHOE TYPE RETURN
SPRING AND BRAKE SHOE ASSEMBLY

Filed June 17, 1960

INVENTOR.
Walther F. Scheel

BY
Strauch, Nolan & Neale

ATTORNEYS

United States Patent Office 3,095,950
Patented July 2, 1963

3,095,950
FLAT, TAPERED HORSESHOE TYPE RETURN SPRING AND BRAKE SHOE ASSEMBLY
Walther F. Scheel, Detroit, Mich., assignor to Rockwell-Standard Corporation, Coraopolis, Pa., a corporation of Pennsylvania
Filed June 17, 1960, Ser. No. 36,927
1 Claim. (Cl. 188—78)

The present invention refers to improvements in vehicle brake mechanism and more particularly to a special brake shoe and return spring assembly.

Difficulties have been encountered with the conventional coiled brake shoe return spring in automotive vehicle brakes and some other less vulnerable spring which will not lose its initial tension during the life of the brake has been sought.

It is known that such conventional wire coil return springs usually accumulate sufficient dirt and rust between the coils to prevent the brake shoes from being fully retracted from the drum, and the result is that the shoes may start to drag and wear unduly. Another disadvantage is that such coil return springs tend to lose their initial tension during service time, partly due to fatigue of the coiled wire and partly because the brake shoes have to be periodically adjusted because of lining wear thereby advancing the brake shoes outwardly which stretches the spring in the brake released position beyond its original installed length and often excessively pre-loading the spring.

The present invention overcomes the foregoing difficulties by using a single leaf tapered U-shaped or "horseshoe" type return spring. While the broad idea of a U-shaped return spring in brakes has been previously proposed and used, the present invention represents a considerable improvement in that direction by reason of special structural characteristics which contribute to improved brake action.

Tests have shown that such a return spring of the preferred embodiment of the invention may be used in heavy duty brakes to great advantage, especially in brakes of the kind having a dual brake shoe web construction. It has been found that a superior return spring can be made by using a single flat leaf spring of good quality spring steel such as S.A.E. 1095, tapering each side of the ends of this leaf and bending the leaf to a "horseshoe" form, the free tapered ends being suitably connected to the opposite brake shoes.

This tapered spring structure, preferably shot-peened, provides a uniform stress distribution throughout the entire length of the spring.

Accordingly, it is the main object of the invention to provide in an automotive brake mechanism a novel single-leaf brake shoe return spring generally of "horseshoe" shape, the free ends of which are decreasingly tapered and suitably connected to opposite brake shoes to effectively and reliably retract the shoes when the brake is being released.

Another object of the present invention is to provide the ends of a generally U-shaped brake shoe return spring with a taper either varying in width or thickness or both and shoe-peening all sides thereof including the tapered portions to achieve a more uniform stress distribution throughout the entire length of the spring.

Still another object of the present invention is to provide a "horseshoe" type brake shoe return spring of novel construction which is especially applicable to heavy duty brake mechanism including those having a dual brake shoe web construction.

Further objects and novel features of the present invention will become evident by the following detailed description in connection with the appended drawings in which:

FIGURE 1 is an elevation view of a generally conventional brake assembly embodying a return spring according to a preferred embodiment of the invention;

FIGURE 3 is a view diagrammatically showing the return spring of FIGURE 1 in unstressed, installed and operationally stressed state;

Figures 2, 3A:
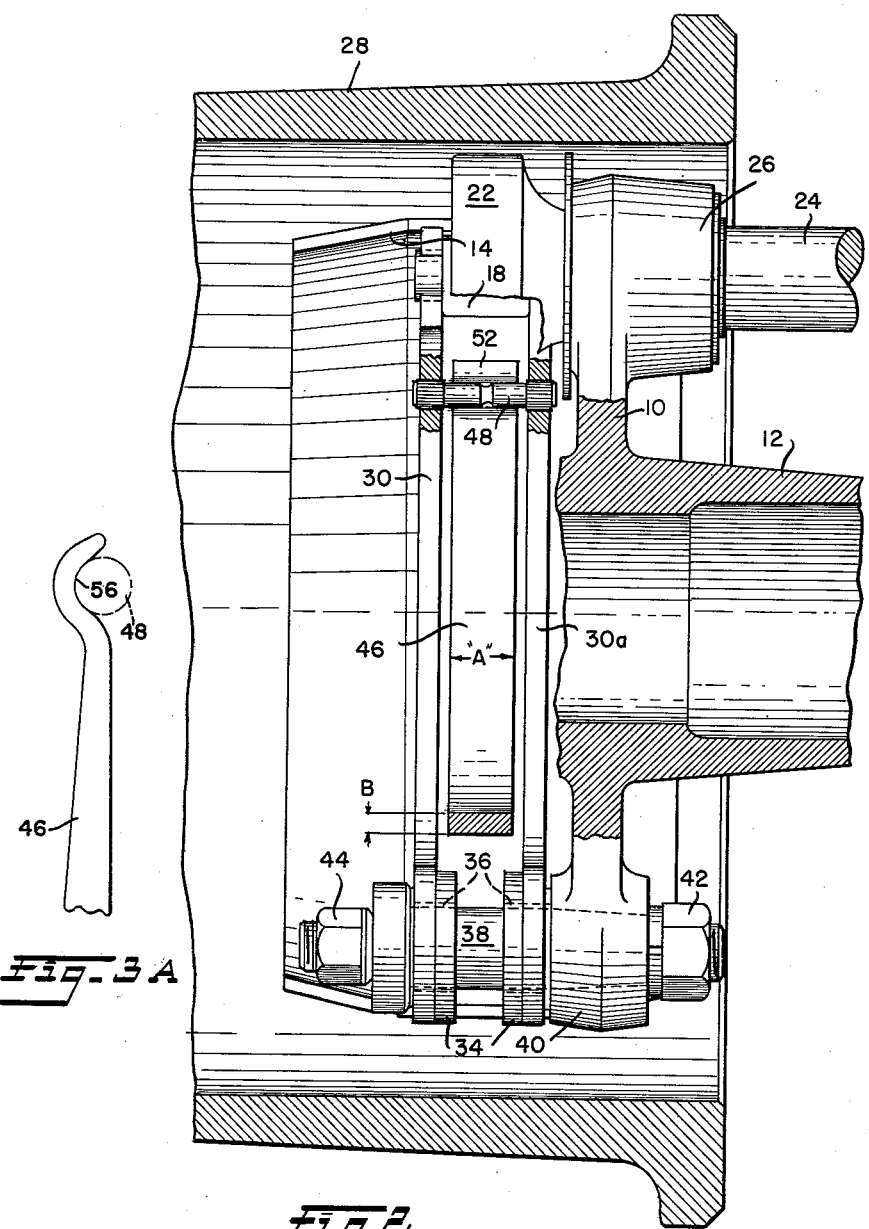
FIGURE 2 is a cross section view through the brake of FIGURE 1 along line 2—2 of FIGURE 1, showing detail.
FIGURE 3A is an enlarged fragmentary side elevational view showing the upper tapered end of one leg of the spring of FIGURE 1.

With reference to FIGURES 1–3, a generally conventional brake assembly is composed of a brake supporting spider 10 rigid with an axle housing 12 and which pivotally supports at their lower ends opposite similar brake shoes 14 and 16. Shoes 14 and 16 are provided at their actuating ends with follower rollers 18 and 20 respectively, engageable by a conventional S-shaped cam 22 rigid with a rotatable camshaft 24 which extends through a camshaft support boss 26 (FIGURE 2) on spider 10. Camshaft 24 is adapted to be rotated by means of a fluid motor (not shown) or mechanical linkage (not shown) to rotate cam 22 to spread brake shoes 14 and 16 apart into contact with a brake drum 28 in the usual manner.

Brake shoes 14 and 16, are of the so-called "fabricated" type, each having two spaced apart parallel brake shoe webs 30 and 30a, and 32 and 32a.

Both brake shoes 14 and 16 are alike and interchangeable and are at their anchor ends provided with welded-on washers 34 and anchor bushings 36 (FIGURE 2) to be pivotally mounted on adjustable tapered anchor pins 38 extending through an opposite anchor boss 40 on spider 10 and secured thereto by lock nuts 42 and adjusting nuts 44.

The space provided between both brake shoe webs 30 and 30a (and 32 and 32a respectively) has been conveniently used to locate and secure the brake shoe return spring of the invention in order to return the shoes to retracted position when the brake is released.

The return spring according to this embodiment of the invention comprises a U-shaped or "horseshoe" type leaf spring 46 the opposite free ends of which are wholly supported on fixed pins 48 and 50 respectively intermediate brake shoe webs 30, 30a and 32, 32a respectively. Pins 48 and 50 are staked into the webs to bridge them as shown in FIGURE 2 and are preferably located near the actuating ends of the brake shoes.

Return spring 46 is symmetrical and consists essentially of a single leaf made of 1095 spring steel or better quality having a width "A" and stock thickness "B." The straight stretched out length of such a spring varies with the size of the brake and braking load requirements. The identical free ends 52 and 54 of the leaf spring 46 are of constant width but decreasingly tapered in thickness as shown in FIGURE 3A particularly usually by rolling or forging a flat length of steel of uniform width "A" and thickness "B," and provided near their ends with inwardly directed semi-circular socket indentations 56 and 58 to provide a secure engagement with pins 48 and 50. Thus the distance between sockets 56 and 58 in the relaxed spring is less than the distance between pins 48 and 50 when the shoes are in retracted position.

The spring leaf 46 after the ends are tapered is bent to a predetermined U-shaped form with ends 52 and 54 slightly inclined towards each other in the relaxed position apart from the brake, as shown at 46' in FIGURE 3. To install the spring 46 into the brake assembly the free ends 52 and 54 are merely bent outwardly until substantially parallel and hooked onto pins 48 and 50. As shown in full lines at 46 in FIGURE 3 this is the position of the parts with the brake released. The installed position of spring 46 places the spring under an initial predetermined preload which depends on the braking load requirements.

By varying the length and degree of taper in relation to the length and thickness of the entire leaf, this spring may be incorporated in substantially any size brake and for any amount of braking load.

Position $46^2$ in FIGURE 3 indicates the position of the fully expanded spring when the brake linings are completely worn off and the shoes are at maximum separation into drum engagement. The spring 46 during its life therefore works through a range from the full line showing at 46 to the dotted line showing at $46^2$ and does not lose its initial tension within this range, so that the brake shoes are always completely reliably returned to the brake disengaged position.

Installation and removal of return spring for relining the shoes is very simple, by using a hook tool (not shown) and can be accomplished with a minimum of disassembly of other parts on the axle.

Referring to FIGURES 1 and 2, it will be observed that the spring 46 has its opposite ends disposed between the dual shoe webs, and this effectively limits lateral displacement of the spring. The sockets 56 and 58 effectively support the entire spring 46 only at those end points, the intermediate part of the spring being free to flex as required during operation. The tendency of the spring to return to the 46' shape of FIGURE 3 aids in this support. The closed end or bridge of the U-shaped spring is disposed near the anchor pivoted ends of the brake shoes.

Figure 4:
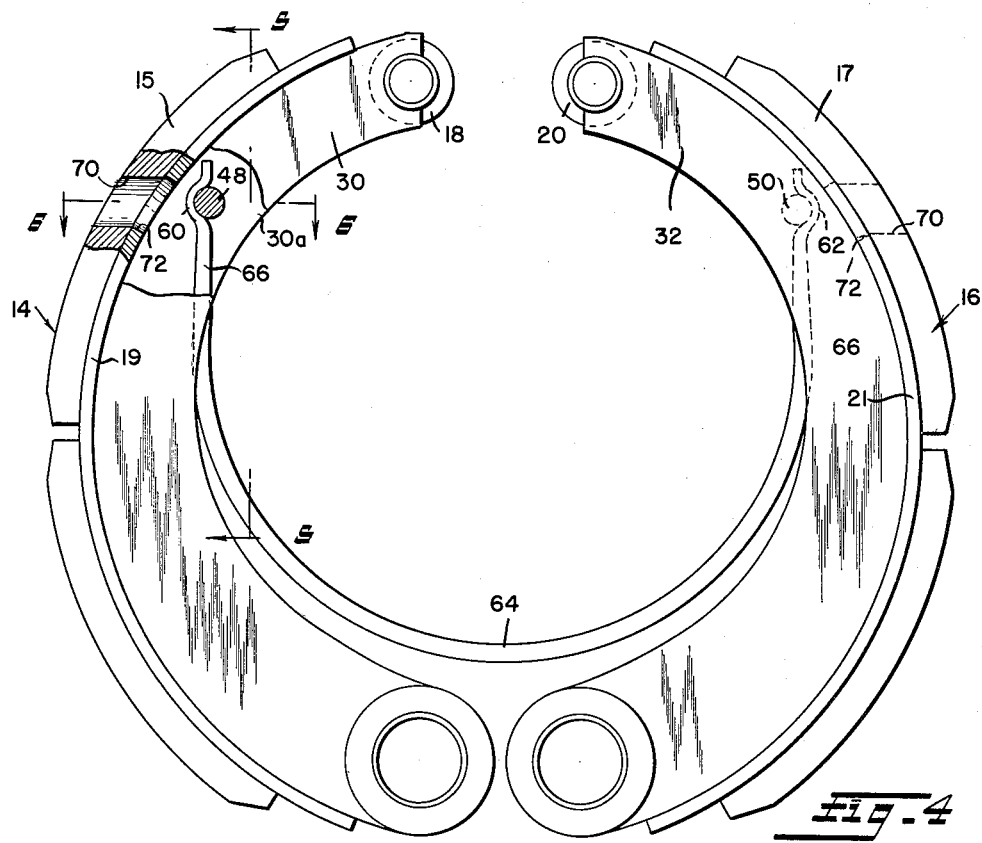
FIGURE 4 shows a brake shoe and return spring assembly similar to that in FIGURE 1 but embodying a differently tapered return spring and showing assembly provisions in the brake shoes.
Figure 6:
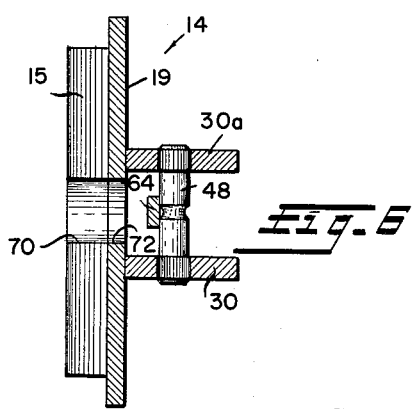
FIGURE 6 is a transverse cross section through the spring attaching means along line 6—6 of FIGURE 4, showing detail.

With reference to FIGURES 4 and 6, there is illustrated a separate brake shoe and return spring assembly which comprises the pivoted brake shoes 14 and 16 having cam follower rollers 18 and 20 at opposite ends of corresponding brake shoe webs 30 and 30a and 32 and 32a. Near the actuating end each pair of brake shoe webs is provided with fixed spring anchor pins 48 and 50 to bridge the gap between the webs as in the FIGURE 1–4 embodiment.

Pins 48 and 50 receive the hooked or socketed ends 60 and 62 of a different return spring 64.

Figure 5:
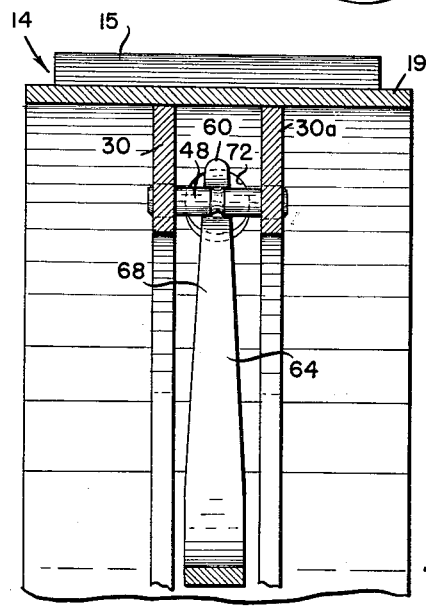
FIGURE 5 is a partial cross section along line 5—5 of FIGURE 4, showing one end of the return spring.

Spring 64 is likewise composed of a single steel spring leaf having opposite ends 66 tapered to vary in thickness similarly to spring 46 of FIGURES 1–4, and here ends 66 are additionally tapered at their ends to vary in width also as shown at 68 in FIGURE 5. Tapering the width of the ends of the spring 64 further enhances the good spring characteristic of this leaf and in addition to a saving in weight and material it facilitates the assembling and disassembling of this spring.

Thus spring 46 may be of the same width over its length with tapered thickness ends, and spring 64 differs from it essentially by also providing tapering width ends and the extremities of a constant width intermediate region. A further embodiment is to provide a leaf spring of constant thickness also with oppositely tapered width ends as at 68 in FIGURE 5.

Either spring 46 or 64 can be assembled or disassembled for servicing or replacement without the necessity of removing the wheel hub which otherwise would have been necessary with conventional brake shoe return spring assemblies. To this end the brake shoe linings 15 and 17 respectively and associated tables 19 and 21 of the brake shoes 14 and 16 are provided with apertures 70 and 72 adjacent or in alignment with the spring pins 48 and 50 to allow access thereto. Apertures 70 and 72 are slightly larger in diameter than the width of spring 46 or 64, and in assembly the spring is inserted with one end through these apertures and threaded around to the opposite anchor pin where this end can be grasped by some sort of hooked tool through the other aperture. The other end of spring 46 or 64 is then likewise grasped with a similar tool through the first brake shoe aperture. By simply applying a pull on one or both assembly tools at the same time the spring can be expanded enabling forcing the hooked spring ends over the anchor pins 48 and 50 in assembled relation with the brake shoes. To disassemble the return springs the process is reversed.

Thus the invention provides a superior brake shoe return spring for heavy duty service which consists of a single spring leaf, tapered at both ends to either vary in thickness or width, or both, and preformed into "horseshoe" shape. In assembly it effectively returns the brake shoes to their "off" position when the brakes are being released, and it will not lose its initial tension during the life of the brake. The rate of the spring remains constant during normal operational life.

This brake shoe return spring of the invention can be speedily assembled or disassembled for service or replacement without removing the wheel hubs, using apertures provided in the brake shoes, or hooked on one shoe and pulled through an aperture in the other with one hook tool.

By varying the length and amount of taper on the spring ends in relation to the overall length of the spring a variety of spring rates can be obtained, to suit brake load requirements.

The present invention may be embodied in other specific forms without departing from the essential characteristics and spirit thereof, therefore, the present embodiment is considered in all respects as illustrative only and not restrictive the scope of the invention being indicated by the appended claims rather than by the foregoing description.

What is claimed and desired to be secured by United States Letters Patent is:

In a brake shoe and return spring assembly wherein two brake shoes are pivoted at adjacent ends and have their other ends adapted to be operably connected to an actuator with each brake shoe comprising an arcuate table, brake lining secured to said table on the convex side thereof and parallel spaced apart dual webs extending from the concave side of said table, anchor pins fixed between said webs near the actuator ends of said shoes, a substantially U-shaped brake shoe return spring having its free ends extending between the webs of the respective shoes and formed with inwardly opening sockets for hookingly engaging said anchor pins, said spring being suspended and supported entirely from said anchor pins so that it is intermediately free of restraint during flexure and stressed on the assembly to urge the actuator ends of said shoes toward each other, and cooperating transverse aligned apertures in said shoes and extending through said brake linings and tables substantially at the vicinity of said pins to enable the introduction of a tool for expanding said spring to permit said sockets to be hookingly engaged with said anchor pins in the assembly of said spring on said brake shoes.

References Cited in the file of this patent
UNITED STATES PATENTS

| | | |
|---|---|---|
| 2,385,540 | Rasmussen | Sept. 25, 1945 |
| 2,608,752 | Schilling | Sept. 2, 1952 |
| 2,671,535 | House | Mar. 9, 1954 |
| 2,928,506 | Goldman | Mar. 15, 1960 |
| 2,505,733 | Famiglietti | Apr. 25, 1960 |

FOREIGN PATENTS

| | | |
|---|---|---|
| 766,692 | France | Apr. 16, 1934 |
| 532,295 | Great Britain | Jan. 21, 1941 |